(12) United States Patent
Chen

(10) Patent No.: US 6,513,076 B1
(45) Date of Patent: Jan. 28, 2003

(54) METHOD OF DETECTING PERIPHERAL COMPONENTS

(75) Inventor: Tai-Cheng Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 09/435,485

(22) Filed: Nov. 8, 1999

(30) Foreign Application Priority Data

Jun. 25, 1999 (TW) ........................................ 88110695 A

(51) Int. Cl.[7] .............................................. G06F 13/14
(52) U.S. Cl. ............................ 710/10; 711/210; 714/5; 714/47; 702/122
(58) Field of Search ................... 710/10, 129; 711/210; 714/5, 47; 702/122

(56) References Cited

U.S. PATENT DOCUMENTS

| | | | |
|---|---|---|---|
| 5,469,554 A | * | 11/1995 | Tucker et al. ............... 395/420 |
| 5,802,393 A | * | 9/1998 | Begun et al. ............... 395/830 |
| 5,809,227 A | * | 9/1998 | Basile ................... 395/184.01 |
| 5,909,560 A | * | 6/1999 | Kenny et al. ............... 395/309 |
| 5,940,586 A | * | 8/1999 | Bealkowski et al. ... 395/182.03 |
| 6,321,174 B1 | * | 11/2001 | Chen et al. ................. 702/122 |

* cited by examiner

Primary Examiner—Jeffrey Gaffin
Assistant Examiner—Abdelmoniem Elamin
(74) Attorney, Agent, or Firm—Rabin & Berdo, P.C.

(57) ABSTRACT

A method of detecting peripheral components for a computer system to effectively start a driver of the peripheral component connected to the bus. By scanning all the buses orderly to detect the peripheral components connected to the buses, the peripheral components can be effectively used. The method can further be applied for the peripheral components connected to the PCI uses, the hierarchy structure formed by the PCI to PCI bridge to start the drivers of the peripheral components.

24 Claims, 4 Drawing Sheets

METHOD OF DETECTING PERIPHERAL COMPONENTS

BACKGROUND OF THE INVENTION

This application incorporates by reference Taiwanese application Serial No. 88110695, Filed Jun. 25, 1999.

1. Field of the Invention

The invention relates in general to a method of detecting peripheral components, and more particularly to a method effectively starting the peripheral components connected to Peripheral Component Interconnect (PCI) buses in a computer network and operating system.

2. Description of the Related Art

Owing to the development of the graphics oriented operating system, such as Windows, TM, OS/2 etc., a bottleneck between the processor and the display peripheral component emerges in the standard Input/Output (I/O) of the Personal Computer (PC). Therefore, local buses are utilized by PC designs to connect the high bandwidth peripherals to the bus of the processor in order to prove the system efficiency.

The Industrial Standard Architecture (ISA) us, a high efficient 16-bit I/O slot bus, was standardized by IBM in 1984. It makes the high efficient PC become popular. Considering the price and efficiency, 32-bit/64-bit PCI bus becomes the most popular and is widely accepted by PC users among various local buses. The PCI bus is a 32-bit or 64-bit multi-tasking bus and gradually takes the place of the conventional ISA bus.

However, the number of the PCI components that can be coupled to the PCI bus is limited when the price and efficiency are considered. Therefore, when the number of the PCI components increases, a number of the PCI buses are needed to fulfill the purpose. Nowadays, the PCI to PCI bridge is commonly used to connect the PCI buses to form the hierarchy structure in the high efficient PC.

The maximum number of components that can be connected to a conventional PCI bus is limited in 3~5. As a result, when a large r number of components is required, a PCI to PCI bridge is required to connect each PC I bus.

Referring to FIG. 1, it is a block diagram of the conventional computer system formed by utilizing a PCI bus. The PCI bus 100 is connected to a Central Processing Unit (CPU) 104, a cache 106, a Dynamic Random Access Memory (DRAM) 108 by a north bridge 102. Moreover, the PCI bus 100 is connected to a keyboard/mouse 112, a power controller 114, a Universal Serial Bus (USB) 116 by a south bridge 110 and is further connected to an outer network system 120 b y a network interface card 118. The north bridge 102 and the south bridge 110 are both he intelligent peripheral controlling chip sets. The north bridge 102 is used to process the system components that require higher efficiency, higher speed, and better performance. Referring to FIG. 1, when the number of the components connected to the computer system is large, the structure of the PCI to PCI bridge is utilized. If the network interface card is connected to the PCI to PCI bridge by another PCI bus, the computer system can not find the exact PCI bus that is connected to the network interface card even though the computer system supports the network interface card to be connected to the PCI bus. Therefore, the computer system can not effectively find the network interface card by another PCI bus to communicate with the network system.

FIG. 2 is a flowchart of the method of detecting the PCI bus In the conventional network system. As in the step 20, the computer system initializes the driver of the component connected to the PCI bus after loading it.

In the step 22, the operating system is called for and it is determined whether or not the system can find the component by the PCI bus. If the system can find the component by the PCI bus, the driver of the component connected to the PCI bus can be successfully started as shown in the step 24. If the ystem can not find the component by the PCI bus, the system fails to start the component as shown in the step 26. Therefore, the component can not be used as the Input/Output (I/O) peripheral of the main system.

SUMMARY OF THE INVENTION

It is therefore an object of the invention to provide a method of detecting the buses for all kinds of the operating systems to effectively load the information of the peripheral components to the operating system by the buses.

It is another object of the invention to provide a method of detecting the peripheral components in a computer system to effectively start the drivers of the peripheral components connected to the PCI bus.

It is yet another object of the invention to provide a method of effectively utilizing the PCI to PCI bridge to connect the PCI buses to form the hierarchy structure and effectively loading the information of the peripheral components to the computer system by the PCI buses-to start the drivers of the components.

According to the object of the invention, a method of detecting peripheral components for a computer system to effectively start a driver of a peripheral component connected to a first bus, wherein the computer system includes a number of second buses, includes the following steps. First, the computer system loads and initializes the driver of the peripheral component. Then, the information of the peripheral component is loaded by the first bus. When the computer system supports the information of the peripheral component, the driver of the peripheral component is started successfully by the computer system and the method of detecting is ended. If the computer system does not support information of the peripheral component, the computer system-starts to scan one of the first bus and the second buses. The computer system reads an In Input/Output (I/O) address of one of the first bus and the second buses. When the I/O address has the information of the peripheral component, the computer system starts the driver of the peripheral component successfully and the method of detecting is ended. If not all the buses are Scanned, the steps return to the step of scanning one of the first bus and the second buses. fall of the first bus and the second buses are scanned, the method of detecting is ended According to another object of the invention , a method of detecting peripheral components connected to PCI buses for a computer system to effectively start a driver of a peripheral component connected to a first PCI us, wherein the computer system includes a number of second PCI buses, includes the following steps. First, the computer system loads the driver of the peripheral component and initializes the driver of the peripheral component. Next, the computer system loads information of the peripheral component by the first PCI bus. While the computer system supports the information of the peripheral component, the driver of the peripheral component is started successfully by the computer system and the method of detecting is ended. If the computer system does not support information of the peripheral component, the computer system starts to scan one of the first PCI us and the second PCI buses. The computer system reads an In Input/Output (I/O) address of one of the first PCI bus and the second PCI buses. When the I/O address has the information of the peripheral component, the computer system starts the driver of the peripheral component successfully and the method of detecting is ended. If not all the PCI buses are scanned, the steps return to the step of scanning one of the first PCI bus and the second PCI buses. If all of the first PCI bus and the second PCI buses are scanned, the method of detecting is ended.

According to yet another object of the invention, a method of detecting peripheral components connected to PCI buses of a computer system to effectively start a driver of a peripheral component connected to a first PCI bus, wherein the computer system includes a number of second PCI buses and a PCI to PCI bridge for connecting the first PCI bus and one of the second PCI buses, includes the following steps. First, the computer system loads the driver of the peripheral component by the first PCI bus. Then, the driver of the peripheral component is transmitted to one of the second PCI buses by the PCI to PCI bridge. If the computer system supports the information of the peripheral component, the computer system starts the peripheral component successfully and the method of detecting is ended. If the computer system does not support the information of the peripheral component, the computer system starts to scan orderly one of the first PCI bus and the second PCI buses. If all of the PCI buses are scanned, the steps return to the step of loading the driver of peripheral component by the first PCI bus. If all of the PCI buses are scanned, the method of detecting is ended.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

For a computer system, the booting procedures are executed first to enter the operating system. The PC, for example, is connected to the peripheral components by a PCI bus. The peripheral components can be PCI components, north bridge, south bridge and so on.

Figure 3:
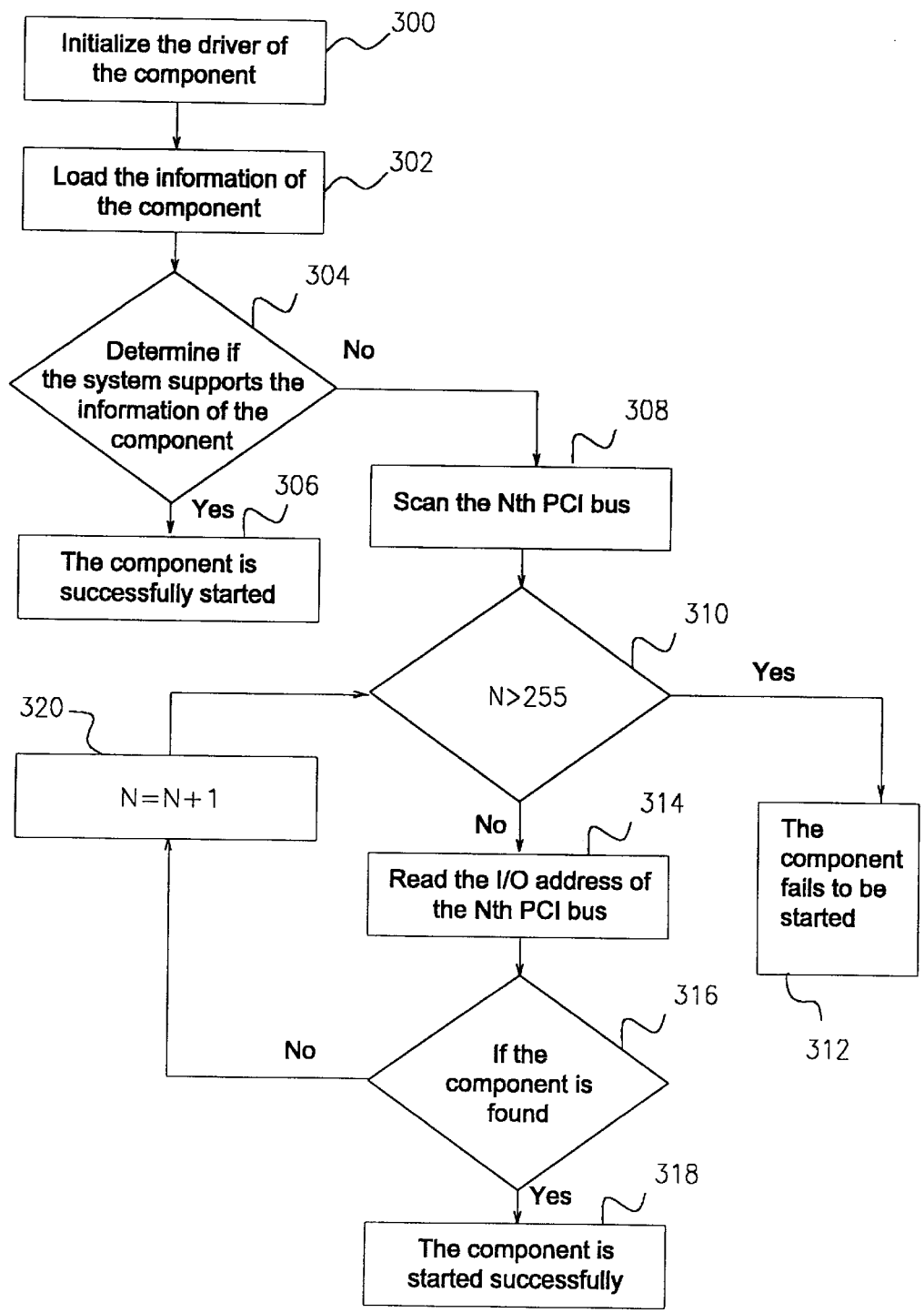
FIG. 3 shows a flowchart of the method of detecting the PCI buses in a network system according to a preferred embodiment of the invention.

FIG. 3 shows the method of detecting the PCI buses in a computer system according to a preferred embodiment of the invention. The problem that most computer systems nowadays do not support the peripheral components to connect to the PCI buses is therefore solved. The peripheral component here, for example, is a network interface card. The operating systems that do not support the network interface card to connect to the PCI bus includes Windows 3.1, Windows 3.11, Windows 95, Windows NT Server 3.1, Windows NT Server 3.5, Windows NT Server 3.51, Windows NT Server 4.0 and so on.

First, as shown in the step 300, the computer system loads and initializes the driver of the component connected to the PCI bus.

Then, the information of the component, for example the information of the network interface card, is loaded by the PCI bus to the operating system as shown in the step 302.

In the step 304, it is determined if the operating system or the Basic Input/Output System (BIOS) supports the PCI bus to load the information of the component is determined. The determining step 304 can be, for example, a step of checking if the loaded information of the component is the supported information of the PCI components.

In the step 304, if the information of the component is supported by the PCI bus, the operating system can successfully receive the information of the component transmitted by the PCI bus. As a result, the drive of the component such as the driver of the network interface card is started successfully as shown in the step 306. Obviously, the achievement of starting the network interface card leads to the effective utilization of the resources of the network system In the determining step 304, If it is found the information of the component not supported by the PCI bus of the operating system, the operating system cannot effectively received the information of the component transmitted by the PCI bus. Therefore, the operating system cannot utilize the component. If the component is a network interface card, the client computer cannot effectively load the driver provided by the remote main server. Conventionally, the driver of the component can not be effectively started in such a situation. However, according to a preferred embodiment of the invention, the client computer started to scan all the other PCI buses as in the step 308.

Because some of the computer systems can support up to 256 PCI buses as the Input/Output (I/O) buses, the number of the PCI bus is scanned is denoted by N (0~255). N is an integer.

In the step 308, let N=0. Then, in the step 310, if N>255, the driver of the component fails to be started as in the step 31 . It means that there is no such component connected to any one of the PCI buses. If N<=255, the step 314 is executed.

In the step 314, the I/O address of the Nth PCI bus is read from the computer system. After the step 314, the step 316 checking for the component in the Nth PCI bus is performed.

In the step 316, if the component is found the Nth PCI bus, the driver of the component is started as in the step 318. If the component is not found in the Nth PCI bus, in the step 320, N adds one. Then, the step 310 is executed to scan the next PCI bus. The recursive steps are repeated until the computer system successfully receives the information of the component transmitted by the PCI bus.

If N>255, which means that all the PCI bus are scanned and there is no such component connected to any one of the PCI buses. Therefore, the component can not be started successfully.

Consequently, although the information for the component is not the one supported by the PCI bus in the operating system, the driver of the component can be successfully started by utilizing the method illustrated in FIG. 3 as long as the component is connected to any one of the PCI bus. Therefore, the operating system can effectively utilize every one of the components that are connected to the PCI buses. For example, the operating system can utilize the network interface card to enter the network system.

Figure 1:
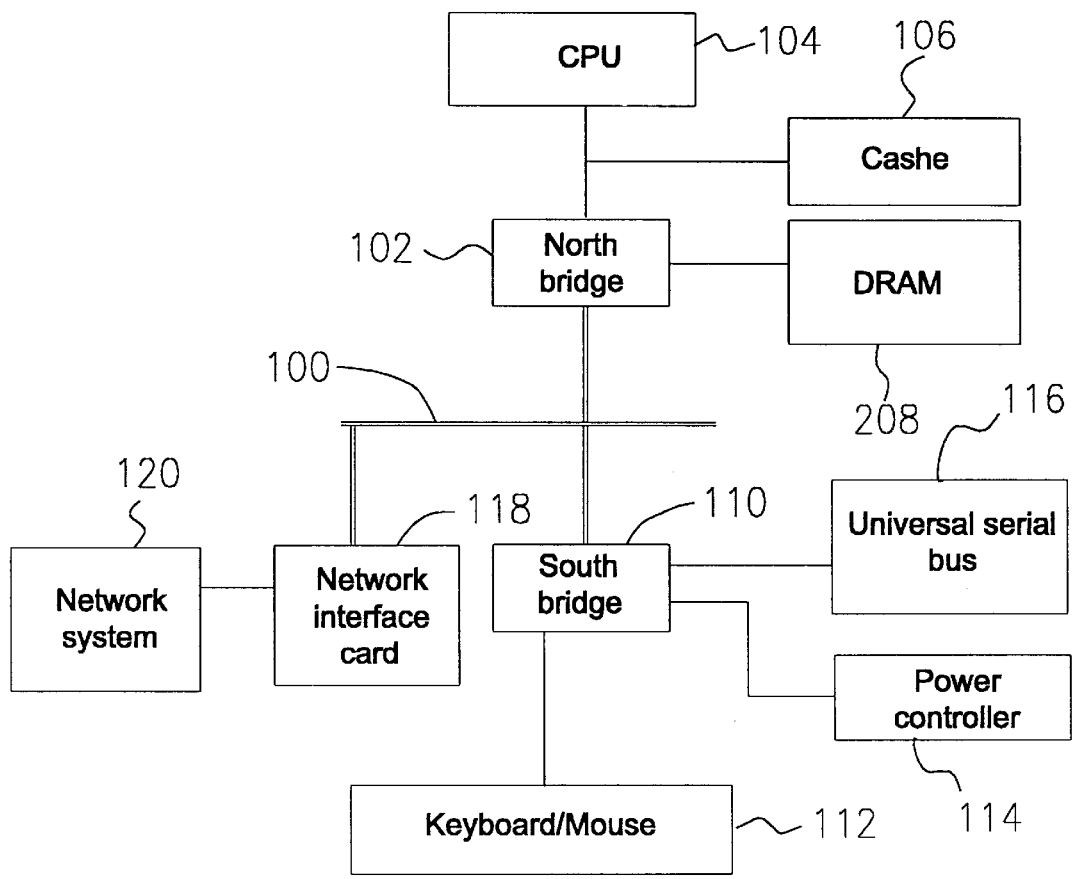
FIG. 1 (Prior Art) shows a block diagram of a conventional computer system utilizing a PCI bus.
Figure 2:
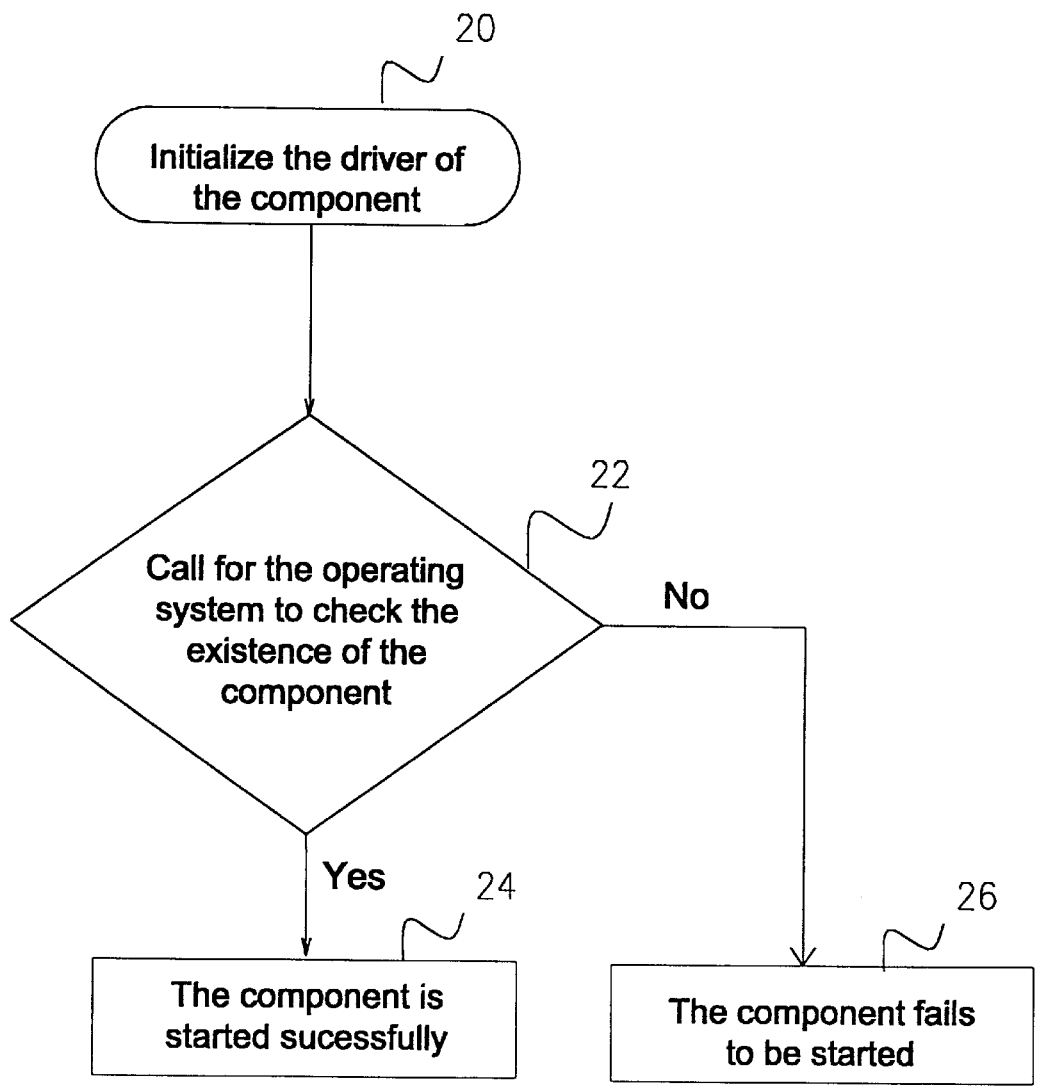
FIG. 2 (Prior Art) shows a flowchart of a conventional method of detecting the PCI bus in a network system.

Furthermore, the method of detecting the PCI bus according to the invention can be effectively applied to the hierarchy structure formed by utilizing the PCI to PCI bridge to connect every PCI bus. With the aid of FIG. 4, the method of detecting the PCI bus according to the invention is illustrated. Part of the structure here is similar to the one shown in FIG. 1. The PCI bus 400 is connected to the CPU 404, the cache 406, and RAM 408 by a north bridge 402 and is further connected to the keyboard/mouse 412, the power controller 414, and the USB 416 by a south bridge 410.

Figure 4:
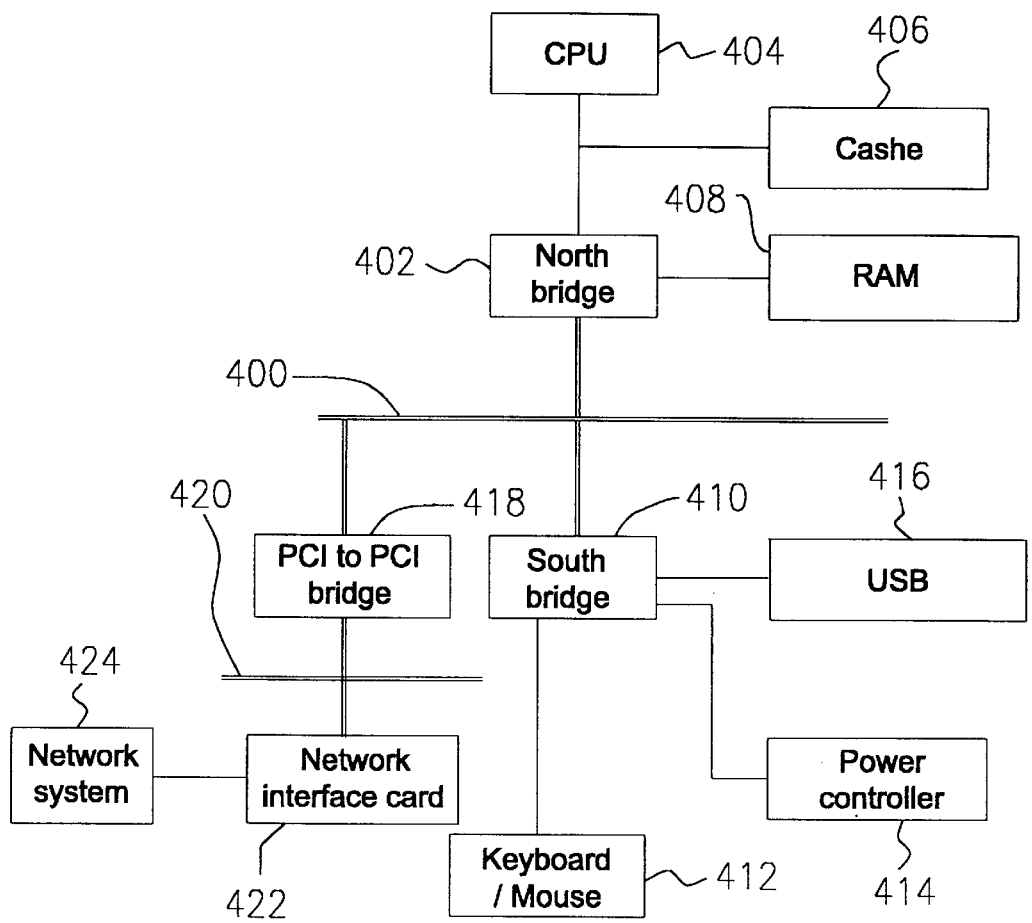
FIG. 4 (Prior Art) shows a block diagram of a computer system formed by utilizing a PCI to PCI bridge.

As shown in FIG. 4, the PCI bus 400 is connected to another PCI bus 420 by a PCI to PCI bridge 418 so that more components can be connected. For example, the PCI bus 400 is connected to the network interface card 422 by the PCI to PCI bridge 418 and the PCI bus 420, and the network interface card 422 is further connected to the outer network system 424.

The north bridge 402 and the south bridge 10 are both intelligent peripheral controlling chipsets. If the number of the components connected to the computer system is large, the hierarchy structure formed by utilizing the PCI to PCI bridge is usually used. However, the computer system can only receive the information of the component by a specific PCI bus. For example, the computer system can only receive the information of the network interface card 422 by the PCI bus 400. Nevertheless, the PCI bus connected to the network interface card 22 is the PCI bus 420. Therefore, the computer system can not enter the network system by the network interface card 422. On the other hand, by utilizing the method illustrated in FIG. 3, the computer system can receive the information of the PCI bus 420 connected to the network interface card 422 by scanning every PCI bus orderly to detect the information of the components connected to the PCI buses. Therefore, the resources of the network system are available.

For example, as shown in the step 300, the river of the component connected to the PCI bus is loaded and initialized first. Then, in the step 302, the information of the PCI component, for example, the driver of the network interface card 422, is loaded by the PCI bus and is then transmitted by the PCI bus 420 and the PCI to PCI bridge 418 to the PCI bus 400.

However, the computer system cannot get the information of the PCI bus connected to the network interface card 422 is the PCI bus 420. Therefore, in the step 304, whether or not the information of the network interface card 422 is supported by the computer system is determined. If yes, the network interface card 422 is started successfully as in the step 306. If no, the computer system starts to scan all the PCI buses as shown in the step 308.

If there is no information of the network interface card 422 found after all the PCI buses are scanned, which means that there is no network interface card connected to any one of the PCI bus. As illustrated in the step 312, and the component fails to be started. If the PCI buses are not yet scanned completely, the steps return to the step 310 to check another PCI bus so that the computer system can thoroughly detect the network interface card connected to any one of the PCI buses.

Obviously, the technical features disclosed the above-mentioned embodiment according to the invention are not limited to the application in the PCI bus. The method disclosed in -the invention can be applied to any peripheral component connected to the bus.

Therefore, it is a feature of the invention to provide a method of detecting the PCI bus for effectively scanning the peripheral components connected to the PCI buses in a computer system.

It is another feature of the invention to provide a method of detecting the peripheral components for effectively scanning every bus in a computer system and in order to utilize the peripheral components.

It is yet another feature of the invention to detect the information of components connected to the PCI bus in all kinds of the operating systems for the operating system to effectively start the driver of the component.

It is yet a further feature of the invention to effectively utilize the PCI to PCI bridge to connect every PCI buses to form the hierarchy structure and start the drivers of the components.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of detecting peripheral components for a computer system to effectively start a driver of a peripheral component connected to a first bus, wherein the computer system comprises a plurality of second buses, comprising the steps of:

loading the driver of the peripheral component to the computer system and initiating the driver of the peripheral component;

loading information of the peripheral component by the first bus;

starting the driver of the peripheral component by the computer system when the computer system supports the information of the peripheral component and ending the method of detecting;

scanning orderly one of the first bus and the second buses by the driver;

ending the method of detecting when all of the first bus and the second buses are scanned;

reading an In Input/Output (I/O) address of one of the first bus and the second buses by the driver;

starting the driver of the peripheral component unsuccessfully by the computer system when the I/O address has the information of the peripheral component and ending the method of detecting; and returning to the step of scanning one of the first bus and the second buses by the driver.

2. A method according to claim 1, wherein the first bus and the second buses are Peripheral Component Interconnect (PCI) buses.

3. A method according to claim 2, wherein the peripheral component is a PCI component.

4. A method according to claim 2, wherein the peripheral component is a south bridge.

5. A method according to claim 2, wherein the peripheral component is a north bridge.

6. A method of detecting peripheral components connected to PCI buses for a computer system to effectively start a driver of a peripheral component connected to a first PCI bus, wherein the computer system comprises plurality of second PCI buses, the method comprising the steps of:

loading the driver of the peripheral component to the computer system and initiating the driver of the peripheral component;

loading information of the peripheral component by the first PCI bus;

starting successfully the driver of the peripheral component by the computer system when the computer system supports the information of the peripheral component and ending the method of detecting;

scanning orderly one of the first PCI bus and the second PCI buses by the driver;

ending the method of detecting when all of the first to PCI bus and the second PCI buses are scanned;

reading an I/O address of one of the first PCI bus and the second PCI buses by the driver;

starting the driver of the peripheral component successfully by the computer system when the I/O address has the information of the peripheral component and ending the method of detecting; and returning to the step of scanning one of the first to PCI bus and the second PCI buses by the driver.

7. A method according to claim 6, wherein the peripheral component is a PCI component.

8. A method according to claim 6, wherein the peripheral component is a south bridge.

9. A method according to claim 6, wherein the peripheral component is a north bridge.

10. A method according to claim 6, wherein the total number of the first PCI bus and the second PCI buses is 256.

11. A method according to claim 10, wherein each of the first PCI bus and the second PCI buses represent the 0th to 255th PCI buses, respectively.

12. A method according to claim 11, wherein the step of scanning one of the first PCI bus and the second PCI buses further comprises the steps of:

letting N=0;

ending the method of detecting when N>225;

reading the I/O address of the Nth PCI bus;

starting the driver of the peripheral component by the computer system when the I/O address has the information of the peripheral component and ending the method of detecting;

letting N=N+1; and returning to the step of ending the method of detecting when N>255.

13. A method according to claim 6, wherein the operating system used in the computer system is a Windows 95.

14. A method according to claim 6, wherein the operating system used in the computer system is a Windows 3.1.

15. A method according to claim 6, wherein the operating system used in the computer system is a Windows 3.11.

16. A method according to claim 6, wherein the operating system used in the computer system is a Windows New Technology (NT) Server 3.1.

17. A method according to claim 6, wherein the operating system used in the computer system is a Windows NT Server 3.5.

18. A method according to claim 6, wherein the operating system used in the computer system is a Windows NT Server 3.51.

19. A method according to claim 6, wherein the operating system used in the computer system is a Windows NT Server 4.0.

20. A method of-detecting peripheral components connected to PCI buses for a computer system to effectively start a driver of a peripheral component connected to a first PCI bus, wherein the computer system comprises a plurality of second PCI buses and a PCI to PCI bridge for connecting the first PCI bus and one of the second PCI buses, the method comprising the steps of:

loading the driver of the peripheral component by the first PCI bus;

transmitting the driver of the peripheral component to one of the second PCI buses by the PCI to PCI bridge;

starting the peripheral component successfully by the computer system when the computer system supports the information of the peripheral component and ending the method of detecting;

scanning orderly one of the first PCI bus an the second PCI buses;

ending the method of detecting when the step of scanning ends; and returning to the step of loading the driver of peripheral component by the first PCI bus.

21. A method according to claim 20, wherein the computer system is a computer system having PCI buses.

22. A method according to claim 20, wherein to peripheral component is a PCI component.

23. A method according to claim 20, wherein the peripheral component is a south bridge.

24. A method according to claim 20, wherein the peripheral component is a north bridge.

* * * * *